July 14, 1942.

W. F. BERCK 2,289,868

BUTTERFLY VALVE OPERATING MECHANISM

Filed Dec. 16, 1940

INVENTOR.
William F. Berck
BY
Oscar A. Mellin
ATTORNEY.

July 14, 1942.  W. F. BERCK  2,289,868

BUTTERFLY VALVE OPERATING MECHANISM

Filed Dec. 16, 1940  3 Sheets-Sheet 3

INVENTOR.
William F. Berck
BY
Oscar A. Mellin
ATTORNEY.

Patented July 14, 1942

2,289,868

UNITED STATES PATENT OFFICE 2,289,868

BUTTERFLY VALVE OPERATING MECHANISM

William F. Berck, Hayward, Calif., assignor to Ralph N. Brodie Company, Oakland, Calif., a corporation of California Application December 16, 1940, Serial No. 370,322

1 Claim. (Cl. 137—104)

This invention relates to valve operating mechanisms and particularly pertains to mechanisms for operating butterfly type valves in connection with fluid meters.

It is the principal object of my present invention to provide an improved mechanism for float or like operation of butterfly type valves, which mechanism renders forces exerted against the valve itself ineffective in operating the same when in open or closed positions, but enables sensitive operation of the valve by float or like means.

In practicing my invention, I provide a butterfly type valve pivoted about a fixed axis and which is fitted with a crank arm for operation. An operating lever is provided which is pivoted on an axis parallel to the axis of the valve but at a point eccentric with relation thereto. One end of this operating lever is connected with a float or like operating device, while the other end is formed with a cam slot engaging a crank pin at the end of the crank arm so that oscillation of the operating lever will be accompanied by oscillation of the valve through the medium of the crank arm. The relationship of the crank arm, crank pin and slot with respect to the pivotal point of the operating lever is such that the line of movement of the crank pin is at all times substantially transversely of the slot and substantially radially of the pivotal point of the operating lever, so that while the operating lever will be effective in operating the crank arm through the medium of the slot and crank pin, forces exerted against the valve will be ineffective in moving the same.

One form which the invention may assume is exemplified in the following description and illustrated by way of example in the accompanying drawings, in which.

In the accompanying drawings I have disclosed my butterfly operating mechanism as employed in connection with a liquid meter, although I am aware that it has a wide range of uses in controlling fluid flow.

Figure 1:
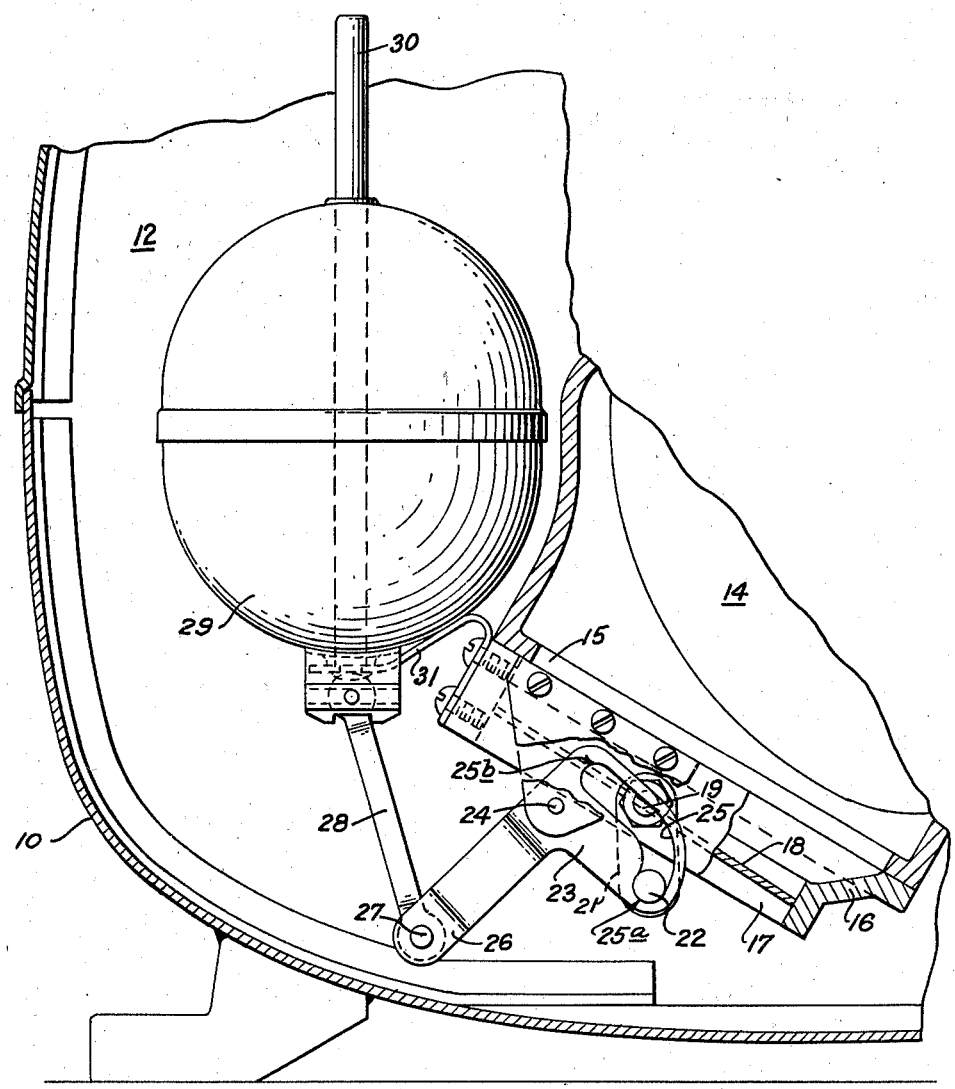
Fig. 1 is a view showing a portion of a fluid meter in section and disclosing my improved valve operating mechanism associated therewith partly in section and with the valve in closed position.

In Fig. 1, 10 illustrates a meter having a float chamber 12 and a second chamber 14, between which is formed an opening 15. Fixed to the meter casing and surrounding this opening 15 is a frame 16 having a circular port 17 formed therethrough. For controlling the passage of fluid through this port 17 is a butterfly valve disc 18 fixed on a shaft 19 journalled at its ends in bearings 20 formed on the frame 16. The shaft 19, of course, extends diametrically of the port 17, as illustrated, and the diameter of the valve disc 18 is such that it may oscillate in the port 17 as is customary in ordinary butterfly type valves.

At the ends of the shaft 19 just exteriorly of the bearings 20 the shaft 19 is fitted with crank arms 21 which are fixed to the shaft in absolute alignment. Each crank arm is fitted with an outwardly extending crank pin 22 so that movement of the crank pins 22 will oscillate the crank arms 21, which movement will be accompanied by opening and closing movement of the valve disc or member 18.

For operating the crank arms 21 through the medium of the crank pins 22, I provide a pair of identical operating levers 23 which are positioned one at each side of the frame in absolute alignment, as illustrated. These operating levers 23 are pivoted to the frame as at 24 on an axis which is parallel to the axis of the shaft 19 but at an eccentric point relative thereto. One end of each operating lever is formed with a cam slot 25 which is engaged with the adjacent crank pin 22, and the other, or operating ends 26 of the levers, are connected together by a cross bar 27 so that the levers will operate in unison. The cross bar 27 is pivotally connected to a connecting rod structure 28, which is in turn connected to a float ball 29 mounted for vertical reciprocation on a fixed float guide rod 30 which, as illustrated, is fixed to the frame 16 by means of a bracket 31.

It is seen that by the mechanism just described, when the float ball 29 reciprocates vertically, the operating levers 23 will be oscillated. It is intended that this oscillation of the levers be translated by the contour of the cam slots 25 into swinging movement of the crank arms 21. The contour of the cam slots 25 is so generated that when the ball is in its lowermost position, the crank pin 22 will be in one end of the slot, or that indicated by 25a, in which position the valve disc 18 will be in closed position, and when the float ball 29 is in raised or elevated position, the crank pin 22 will be at the opposite end of the slot, or that indicated by 25b, in which position the crank arms will have been moved so as to dispose the valve disc 18 in open position.

Therefore, when the float ball rises from the position shown in Fig. 1, the operating ends of the levers 23 will swing upwardly causing the cam slot 25 to simultaneously swing the crank arms 21 in a position moving the valve disc 18 to open position until the crank pins 22 nest in the opposite ends 25b of the cam slot 25. When the float ball 29 lowers, the operating ends 26 of the levers 23 will swing downwardly, or in the opposite direction, and the cam slot 25 will move the crank levers 21 in a direction moving the valve disc 18 to closed position.

I desire to here point out that the relationship of the crank arms 21 and their crank pins and the cam slots 25 with the pivotal point 24 of the levers 23 is such that when the valve is in fully opened or closed positions, it will be latched in such positions so that no force exerted on the valve will be effective in operating the same. That is to say, referring to Fig. 1, which shows the valve in closed position, it will be seen that the crank pins 22 are disposed in the ends 25a of the slots 25 with the crank arms 21 so disposed that the path of movement of the crank pins 22 will be substantially transversely of the slot 25 and substantially radially of the pivotal point 24 of the levers 23. Consequently, forces exerted against the valve 18 tending to open the same will be ineffective as the crank pins 22 will be latched from movement.

Figure 2:
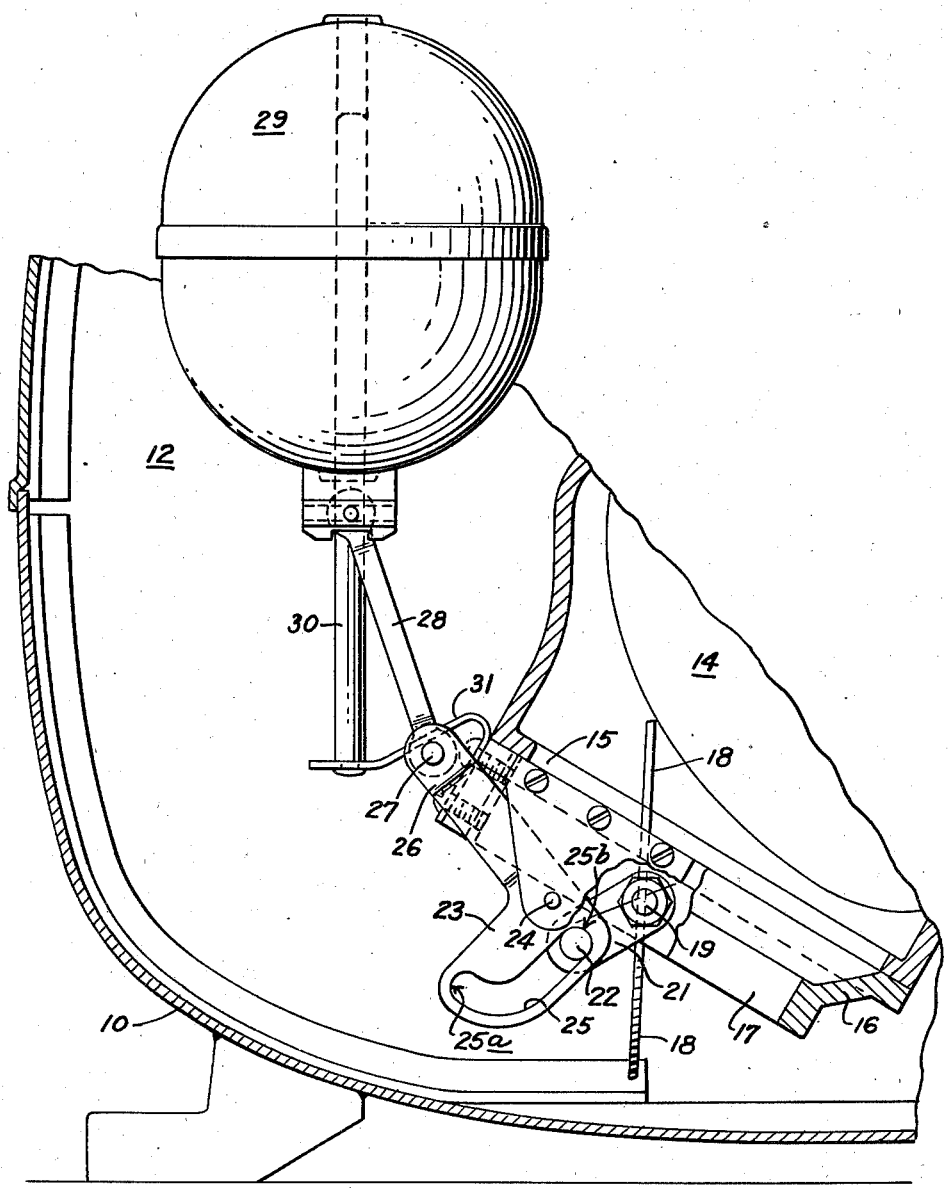
Fig. 2 is a similar view showing the position which the parts of the mechanism assume when the valve is in open position.
Figure 3:
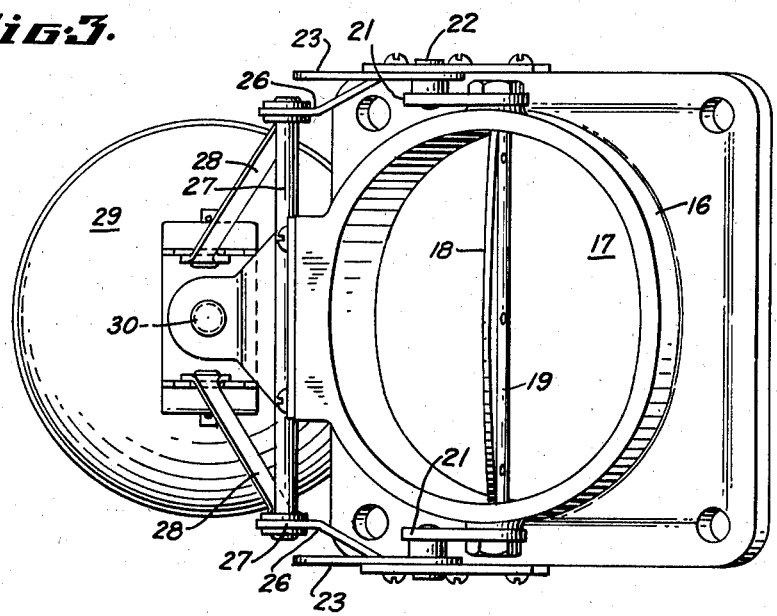
Fig. 3 is a bottom view of the valve operating mechanism.
Figure 4:
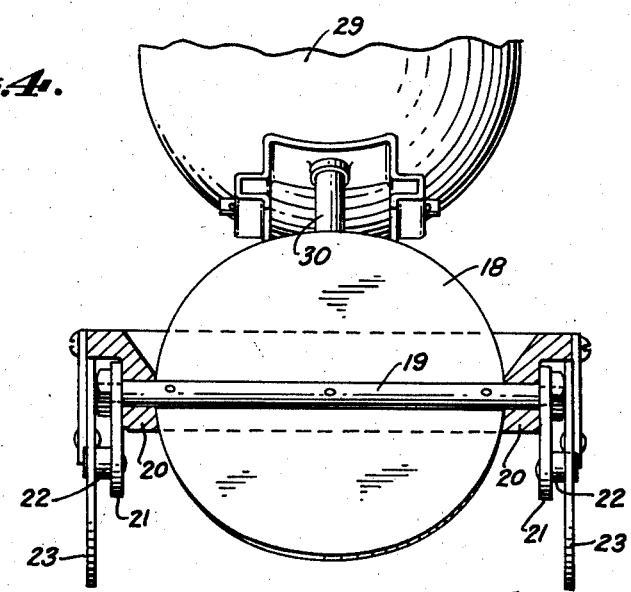
Fig. 4 is a sectional view taken through the valve operating mechanism along the axis of the valve shaft.

This is likewise true when in open position as is shown in Fig. 2. There again, with the valve in open position, any attempt to swing the valve about its axis will tend to move the crank pins 22 in a direction transversely of the slot 25 and radially of the pivotal point of the levers 23. Therefore, any attempt to operate the valve by forces applied to the valve itself will be ineffective.

The feature of latching the valve in closed position is quite an important one, particularly when the valve is used in connection with fluid meters, because in the first rush of fluid into the meter, if the force of the fluid is allowed to open or partly open the valve, considerable air will be allowed to pass through the meter, which is highly undesirable. By use of my improved mechanism, the valve will be prevented from opening except by action of the float regardless of the turbulence or rush of fluid against the valve. Likewise, it is important that the valve be latched in open position because the turbulence of the fluid at high speeds will have a tendency to close the valve against the action of the float.

I also desire to point out that a very favorable lever ratio for the float is provided herein to enable operation of the valve regardless of the fact that the valve shaft bearings will be loaded with increased friction due to fluid pressure.

From the foregoing it is obvious that I have provided a very efficient mechanism for operating butterfly valves, which mechanism will cause the valve to be latched in both open and closed positions so that any forces exerted on the valve tending to operate the same will be ineffective, but which enables the float action to easily operate the valve under all operating conditions.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A mechanism of the character described comprising a butterfly valve member having a central pivotal shaft, a crank arm connected to the valve shaft for operating the same about its axis, a crank pin on said arm, an operating lever pivoted on an axis parallel to the axis of the valve shaft but located at a point eccentric with relation thereto, one end of said operating lever being formed with a cam slot engaging said pin to translate oscillation of the lever into oscillation of said arm, the length and configuration of said cam slot being sufficient to move said arm from one end of its stroke to the other by a camming action, the relationship of the crank arm, the crank pin and slot relative to the pivotal point of the operating lever being such that at the opposite ends of the stroke of the arm the line of movement of the crank pin will be substantially transversely of the slot and substantially radially of the pivotal point of the lever, and float means connected to the other end of the operating lever.

WILLIAM F. BERCK.